US012637271B2

(12) United States Patent
Garduno et al.

(10) Patent No.: US 12,637,271 B2
(45) Date of Patent: May 26, 2026

(54) SECURITY TAG HOUSING

(71) Applicants: Gabriel Garduno, Minneapolis, MN (US); Jeffrey Allen Comstock, Edgerton, WI (US); Keith C. Eden, Loves Park, IL (US); Thomas O. Nagel, Rockford, IL (US)

(72) Inventors: Gabriel Garduno, Minneapolis, MN (US); Jeffrey Allen Comstock, Edgerton, WI (US); Keith C. Eden, Loves Park, IL (US); Thomas O. Nagel, Rockford, IL (US)

(73) Assignee: Fasteners for Retail, Inc., Twinsburg, OH (US)

( * ) Notice: Subject to any disclaimer, the term of this patent is extended or adjusted under 35 U.S.C. 154(b) by 184 days.

(21) Appl. No.: 18/415,265

(22) Filed: Jan. 17, 2024

(65) Prior Publication Data

US 2024/0270461 A1 Aug. 15, 2024

Related U.S. Application Data

(60) Provisional application No. 63/484,673, filed on Feb. 13, 2023.

(51) Int. Cl.
*B65D 55/02* (2006.01)
*G06K 19/077* (2006.01)

(52) U.S. Cl.
CPC ....... *B65D 55/028* (2013.01); *G06K 19/0772* (2013.01)

(58) Field of Classification Search
CPC .............. B65D 55/028; G06K 19/0772; E05B 73/0017; E05B 73/0029; E05B 45/005; E05B 73/0005

USPC ...................................................... 206/459.1
See application file for complete search history.

(56) References Cited

U.S. PATENT DOCUMENTS

| | | | |
|---|---|---|---|
| 3,202,331 A | 8/1965 | McKinstrie |
| D229,085 S | 11/1973 | Lutenegger |
| D258,120 S | 2/1981 | Muramatsu |
| 4,383,242 A | 5/1983 | Sassover et al. |
| 4,462,023 A | 7/1984 | Nielsen et al. |
| D288,788 S | 3/1987 | Richard |
| 4,649,552 A | 3/1987 | Yukawa |
| D314,346 S | 2/1991 | Spencer et al. |
| 4,996,515 A | 2/1991 | Schaffer et al. |
| 5,068,643 A | 11/1991 | Yashina |
| 5,086,641 A | 2/1992 | Roselli |
| 5,097,705 A | 3/1992 | Porter |
| 5,119,677 A | 6/1992 | Porter |

(Continued)

FOREIGN PATENT DOCUMENTS

| | | | |
|---|---|---|---|
| JP | 2019128636 A | 8/2019 |
| JP | 6975973 B2 * | 12/2021 |

(Continued)

OTHER PUBLICATIONS

U.S. Appl. No. 29/863,693, filed Dec. 21, 2022, Garduno.

*Primary Examiner* — Anthony D Stashick
*Assistant Examiner* — L Kmet
(74) *Attorney, Agent, or Firm* — Reinhart Boerner Van Deuren P.C.

(57) ABSTRACT

A housing for a security tag having improved band attachments is provided. The housing includes undercut regions for receipt of the band to allow for securement of the band to the security tag.

17 Claims, 5 Drawing Sheets

(56) References Cited

U.S. PATENT DOCUMENTS

| | | | |
|---|---|---|---|
| 5,168,263 | A | 12/1992 | Drucker |
| D337,067 | S | 7/1993 | Patterson |
| D342,035 | S | 12/1993 | Glucroft |
| 5,317,304 | A | 5/1994 | Choi |
| D347,584 | S | 6/1994 | Vogelpohl |
| D351,563 | S | 10/1994 | DellaVilla |
| 5,417,319 | A | 5/1995 | Chalberg et al. |
| D359,700 | S | 6/1995 | Abrams |
| 5,434,559 | A | 7/1995 | Smiley et al. |
| 5,469,135 | A | 11/1995 | Solow |
| 5,570,080 | A | 10/1996 | Inoue et al. |
| D376,544 | S | 12/1996 | Egbert |
| D391,508 | S | 3/1998 | Lucas |
| 5,757,270 | A | 5/1998 | Mori |
| 5,815,066 | A | 9/1998 | Pumilia |
| 5,838,225 | A | 11/1998 | Todd |
| 5,850,180 | A | 12/1998 | Hess |
| 5,905,438 | A | 5/1999 | Weiss et al. |
| 5,955,951 | A | 9/1999 | Wischerop et al. |
| 5,965,954 | A | 10/1999 | Johnson et al. |
| 5,977,654 | A | 11/1999 | Johnson et al. |
| 5,979,674 | A | 11/1999 | Thalenfeld |
| D419,899 | S | 2/2000 | Levar et al. |
| D421,927 | S | 3/2000 | Binder et al. |
| D422,487 | S | 4/2000 | Khokhar |
| 6,049,268 | A | 4/2000 | Flick |
| D424,463 | S | 5/2000 | Babers, Jr. |
| D427,104 | S | 6/2000 | Cooper |
| 6,133,830 | A | 10/2000 | D'Angelo et al. |
| D445,682 | S | 7/2001 | Michael et al. |
| D446,118 | S | 8/2001 | Michael et al. |
| 6,326,890 | B1 | 12/2001 | Costa |
| D453,483 | S | 2/2002 | Choe |
| 6,373,381 | B2 | 4/2002 | Wu |
| D459,206 | S | 6/2002 | Caveney et al. |
| 6,517,000 | B1 | 2/2003 | McAllister et al. |
| 6,577,388 | B2 | 6/2003 | Kallabis |
| D478,831 | S | 8/2003 | So |
| 6,604,643 | B1 | 8/2003 | Michael et al. |
| 6,628,344 | B1 | 9/2003 | Weber |
| 6,690,411 | B2 | 2/2004 | Naidoo et al. |
| 6,769,557 | B2 | 8/2004 | Michael et al. |
| 6,912,878 | B2 | 7/2005 | Belden, Jr. |
| 6,967,578 | B1 | 11/2005 | Guida |
| 7,004,340 | B2 | 2/2006 | Belden, Jr. |
| 7,007,523 | B2 | 3/2006 | Belden, Jr. |
| D520,393 | S | 5/2006 | Darby |
| D525,198 | S | 7/2006 | Ikeda et al. |
| D528,020 | S | 9/2006 | Brown et al. |
| 7,100,783 | B2 | 9/2006 | Belden, Jr. |
| 7,100,784 | B2 | 9/2006 | Belden, Jr. |
| D534,822 | S | 1/2007 | Wadda |
| D535,205 | S | 1/2007 | Frederick et al. |
| D536,627 | S | 2/2007 | Behling |
| 7,174,176 | B1 | 2/2007 | Liu |
| 7,210,164 | B1 | 4/2007 | Jandrell |
| 7,258,461 | B1 | 8/2007 | Izardel |
| 7,259,967 | B2 | 8/2007 | Ni |
| 7,321,308 | B1 | 1/2008 | Feibelman |
| D565,973 | S | 4/2008 | Huang et al. |
| 7,350,652 | B2 | 4/2008 | Belden, Jr. |
| 7,350,653 | B2 | 4/2008 | Belden, Jr. |
| 7,350,654 | B2 | 4/2008 | Belden, Jr. |
| 7,350,655 | B2 | 4/2008 | Belden, Jr. |
| D573,903 | S | 7/2008 | Gatz et al. |
| 7,397,375 | B2 | 7/2008 | Marsilio et al. |
| D578,906 | S | 10/2008 | Gatz et al. |
| D579,788 | S | 11/2008 | Brady et al. |
| 7,463,152 | B2 | 12/2008 | Marsilio et al. |
| D584,172 | S | 1/2009 | Soltani |
| 7,486,190 | B2 | 2/2009 | Marsilio et al. |
| 7,492,263 | B2 | 2/2009 | Marsilio et al. |
| 7,492,264 | B2 | 2/2009 | Marsilio et al. |
| 7,492,265 | B2 | 2/2009 | Marsilio et al. |
| 7,498,944 | B2 | 3/2009 | Marsilio et al. |
| 7,498,945 | B2 | 3/2009 | Marsilio et al. |
| 7,522,048 | B2 | 4/2009 | Belden, Jr. |
| 7,530,188 | B2 | 5/2009 | Beilenhoff et al. |
| 7,543,466 | B2 | 6/2009 | Loughlin et al. |
| 7,552,048 | B2 | 6/2009 | Xu et al. |
| 7,584,930 | B2 | 9/2009 | Zich |
| 7,591,422 | B2 | 9/2009 | Maitin |
| 7,602,297 | B2 | 10/2009 | Marsilio et al. |
| D607,347 | S | 1/2010 | Goh et al. |
| 7,650,768 | B2 | 1/2010 | Fawcett et al. |
| 7,671,741 | B2 | 3/2010 | Lax et al. |
| 7,671,742 | B2 | 3/2010 | Fallin et al. |
| 7,768,399 | B2 | 8/2010 | Hachmann et al. |
| 7,916,020 | B2 | 3/2011 | Seidel |
| D638,324 | S | 5/2011 | Tang |
| 7,969,305 | B2 | 6/2011 | Belden, Jr. et al. |
| 7,984,629 | B2 | 7/2011 | Xiaobin |
| D649,895 | S | 12/2011 | Stifle et al. |
| 8,103,047 | B1 | 1/2012 | Griess et al. |
| 8,139,945 | B1 | 3/2012 | Amir et al. |
| 8,274,391 | B2 | 9/2012 | Yang |
| 8,305,219 | B2 | 11/2012 | Yang |
| D672,667 | S | 12/2012 | Mix |
| 8,368,542 | B2 | 2/2013 | Yang |
| 8,373,564 | B2 | 2/2013 | Wyatt, Jr. et al. |
| 8,378,826 | B2 | 2/2013 | Mercier et al. |
| D679,618 | S | 4/2013 | Dumas et al. |
| D688,967 | S | 9/2013 | Wilson |
| 8,528,372 | B2 | 9/2013 | Nilsson |
| 8,534,469 | B2 | 9/2013 | Northrup, Jr. et al. |
| 8,629,772 | B2 | 1/2014 | Valiulis et al. |
| 8,640,509 | B2 | 2/2014 | Will |
| D706,500 | S | 6/2014 | Hu |
| D707,823 | S | 6/2014 | Scherbing |
| D708,534 | S | 7/2014 | Martin |
| 8,884,761 | B2 | 11/2014 | Valiulis |
| 8,938,997 | B2 | 1/2015 | Piccoli et al. |
| 9,009,773 | B1 | 4/2015 | Hendricks et al. |
| D730,225 | S | 5/2015 | Behar |
| D733,601 | S | 7/2015 | Solow |
| D733,714 | S | 7/2015 | Ballou et al. |
| D736,657 | S | 8/2015 | Detering et al. |
| 9,169,670 | B2 | 10/2015 | Shute et al. |
| D742,817 | S | 11/2015 | Lammers-Meis et al. |
| D749,592 | S | 2/2016 | Huang |
| D751,558 | S | 3/2016 | Lee |
| D752,469 | S | 3/2016 | Rastrick |
| 9,324,220 | B2 | 4/2016 | Valiulis |
| 9,404,291 | B1 | 8/2016 | White et al. |
| D767,435 | S | 9/2016 | Lee |
| D770,321 | S | 11/2016 | Murphy et al. |
| 9,524,626 | B2 | 12/2016 | Brühwiler et al. |
| D782,342 | S | 3/2017 | Dwivedula et al. |
| D782,475 | S | 3/2017 | Yu et al. |
| D802,466 | S | 11/2017 | Yu |
| 9,830,792 | B1 | 11/2017 | Yang |
| D807,877 | S | 1/2018 | Iwamatsu et al. |
| D813,659 | S | 3/2018 | Ostoyic |
| D815,551 | S | 4/2018 | Taylor et al. |
| 9,934,665 | B1 | 4/2018 | Zhang |
| 9,965,933 | B1 | 5/2018 | Schneider et al. |
| D823,841 | S | 7/2018 | Marini |
| 10,066,422 | B2 | 9/2018 | Yang |
| 10,121,340 | B2 | 11/2018 | Yang |
| D835,364 | S | 12/2018 | Lee et al. |
| D838,854 | S | 1/2019 | Lumme |
| 10,309,663 | B1 | 6/2019 | Taber et al. |
| D863,995 | S | 10/2019 | Ueda |
| D867,188 | S | 11/2019 | Virhiä et al. |
| D870,399 | S | 12/2019 | Van Curen et al. |
| 10,529,207 | B1 | 1/2020 | Yang |
| D890,456 | S | 7/2020 | Dai |
| D896,117 | S | 9/2020 | Nagel et al. |
| D908,112 | S | 1/2021 | Eshelman et al. |
| 10,885,753 | B2 | 1/2021 | Ewing et al. |
| D909,216 | S | 2/2021 | Vuletici et al. |
| D920,824 | S | 6/2021 | Matula et al. |
| D921,499 | S | 6/2021 | Konotopskyi et al. |
| D922,883 | S | 6/2021 | Tabbah |

(56)                    References Cited

U.S. PATENT DOCUMENTS

| | | |
|---|---|---|
| D928,011 S | 8/2021 | Vonau et al. |
| 11,087,601 B1 | 8/2021 | Ewing et al. |
| D946,569 S | 3/2022 | Yang et al. |
| 11,322,005 B2 | 5/2022 | Wang et al. |
| D955,907 S | 6/2022 | Abellera et al. |
| D956,607 S | 7/2022 | Eden et al. |
| D979,436 S | 2/2023 | Boucard et al. |
| D987,915 S | 5/2023 | Luo |
| D988,167 S | 6/2023 | Eden et al. |
| D990,076 S | 6/2023 | Li |
| D990,563 S | 6/2023 | Kane |
| D991,593 S | 7/2023 | Zhang |
| D992,441 S | 7/2023 | Saladino |
| D994,238 S | 8/2023 | Xiao |
| D995,954 S | 8/2023 | Luo |
| D996,254 S | 8/2023 | Rosengarten |
| 2002/0067259 A1 | 6/2002 | Fufidio et al. |
| 2002/0130776 A1 | 9/2002 | Houde |
| 2002/0188866 A1 | 12/2002 | Ca et al. |
| 2003/0030548 A1 | 2/2003 | Kovacs et al. |
| 2003/0175004 A1 | 9/2003 | Garito et al. |
| 2003/0227382 A1 | 12/2003 | Breed |
| 2004/0145477 A1 | 7/2004 | Easter et al. |
| 2004/0237267 A1 | 12/2004 | Copen et al. |
| 2005/0093704 A1 | 5/2005 | Fiebelman |
| 2005/0104733 A1 | 5/2005 | Campero |
| 2005/0261816 A1 | 11/2005 | DiCroce et al. |
| 2006/0198611 A1 | 9/2006 | Park |
| 2007/0115100 A1 | 5/2007 | Mandle |
| 2007/0171059 A1 | 7/2007 | Pistilli |
| 2009/0079557 A1 | 3/2009 | Miner |
| 2009/0095695 A1 | 4/2009 | Moock et al. |
| 2009/0109027 A1 | 4/2009 | Schuller |
| 2009/0308494 A1 | 12/2009 | Linn |
| 2010/0069848 A1 | 3/2010 | Alferness et al. |
| 2010/0097223 A1 | 4/2010 | Kruest et al. |
| 2010/0154265 A1 | 6/2010 | Poulokefalos |
| 2010/0175438 A1 | 7/2010 | Sankey |
| 2010/0253524 A1 | 10/2010 | Kolton et al. |
| 2011/0062794 A1 | 3/2011 | Vergoossen et al. |
| 2011/0068921 A1 | 3/2011 | Shafer |
| 2011/0215060 A1 | 9/2011 | Niederhuefner |
| 2011/0227706 A1 | 9/2011 | Yang |
| 2011/0227735 A1 | 9/2011 | Fawcett et al. |
| 2011/0260594 A1 | 10/2011 | Yang |
| 2011/0310307 A1 | 12/2011 | Takahashi |
| 2012/0031980 A1 | 2/2012 | Tiedmann |
| 2012/0287090 A1 | 11/2012 | Cacioppo |
| 2013/0057524 A1 | 3/2013 | Bertin et al. |
| 2013/0142494 A1 | 6/2013 | Valiulis et al. |
| 2014/0055264 A1 | 2/2014 | Valiulis et al. |
| 2014/0070948 A1 | 3/2014 | Valiulis et al. |
| 2015/0042178 A1 | 2/2015 | Kim |
| 2015/0287299 A1 | 10/2015 | Eckert et al. |
| 2015/0298885 A1 | 10/2015 | Giller |
| 2016/0356064 A1 | 12/2016 | Ewing et al. |
| 2021/0279539 A1 | 9/2021 | Eden et al. |
| 2021/0355715 A1 | 11/2021 | Eden et al. |
| 2022/0083137 A1 | 3/2022 | Fountain |
| 2022/0149509 A1 | 5/2022 | Kawasaki et al. |
| 2024/0078883 A1 | 3/2024 | Zhang |

FOREIGN PATENT DOCUMENTS

| | | |
|---|---|---|
| KR | 100823026 B1 | 4/2008 |
| KR | 20110043837 A | 4/2011 |
| WO | WO 01/81988 A2 | 11/2001 |
| WO | WO 2009/100857 A1 | 8/2009 |

* cited by examiner

SECURITY TAG HOUSING

CROSS-REFERENCE TO RELATED PATENT APPLICATIONS

This patent application claims the benefit of U.S. Provisional Patent Application No. 63/484,673, filed Feb. 13, 2023, the entire teachings and disclosure of which are incorporated herein by reference thereto.

FIELD OF THE INVENTION

This invention generally relates to retail systems, and, more particularly, to theft detection devices for use in a retail environment.

BACKGROUND OF THE INVENTION

Loss prevention in the retail merchandise industries remains a paramount concern. Various loss prevention technologies have been implemented to deter both single and multi-product theft. For non-limiting example, some devices such as Electronic Article Surveillance (EAS) tag systems may be attached to product packaging and then sound an alarm upon a potential theft event, such as crossing through a gate at the retail establishment, the removal of a large amount of product from a display at once, blocking light to the EAS tag, movement of the EAS tag, removal from the package, etc.

These EAS tags also include some type of internal signal emitter, or signal interrupter, (collectively referred to herein as a "signal emitter") which generates (or interrupts) a signal continuously or selectively after excitation by an external device. Such signal emitters may be for non-limiting example electro-magnetic, acousto-magnetic, or radio-frequency based. The signal generated by the internal signal emitter is typically detected by a gate or other device at the entry/exit point of the retail establishment. If an active EAS tag passes through this gate or other device, an alarm or other notification is generated.

The EAS tags are often secured to the packaging of a product by adhesives, locking mechanisms, wires, bands, or other means.

Examples of the present disclosure provide improvements over the current state of the art for EAS tags.

BRIEF SUMMARY OF THE INVENTION

In one aspect, the invention provides a new and improved security tags (EAS tags). In particular, a new and improved housing for a security tag is provided. The new and improved housing provides improved attachment of an attachment band or cable to the housing of the security tag.

The housing includes undercut regions through which the band or cable can pass when attaching the band or cable to the housing of the security tag.

In one example, a housing for a security tag is provided. The housing includes a top wall, an annular side wall, a shoulder region and first and second notches. The top wall has a top wall outer surface and an opposed top wall inner surface. The annular sidewall wall extends outward from the top wall forming an intersection therebetween. The annular sidewall has a sidewall outer surface and a sidewall inner surface. The shoulder region is formed proximate the intersection of the top wall and the annular wall. The first notch is formed in a first portion of the shoulder region. The first notch has first and second projections extending towards one another. Distal ends of the first and second projections are spaced apart a first distance forming a first gap therebetween. The first projection forms a first undercut region of the first notch. The second projection forms a second undercut region of the first notch. The second notch is formed in a second portion of the shoulder region. The second portion of the shoulder region is on an opposed side of top wall as the first portion of the shoulder region. The second notch has third and fourth projections extending towards one another. Distal ends of the third and fourth projections are spaced apart a second distance forming a second gap therebetween. The third projection forms a third undercut region of the second notch. The fourth projection forms a fourth undercut region of the second notch.

In one example, the annular sidewall includes first, second, third and fourth sidewall portions. The first and second sidewall portions are spaced apart and opposed from one another. The third and fourth sidewall portions are spaced apart and opposed from one another. The third and fourth sidewall portions extend between the first and second sidewall portions. The first portion of the shoulder region is provided between the first sidewall portion and the top wall. The second portion of the shoulder region is provided between the second sidewall portion and the top wall.

In one example, the first notch has a first bottom surface that faces outward. The first and second projections are spaced outward from the first bottom surface. The first undercut region is formed between the first projection and the first bottom surface. The second undercut region is formed between the second projection and the first bottom surface. The first bottom surface extends at a non-parallel, non-perpendicular angle to the outer surface of the top wall and at a non-parallel, non-perpendicular angle to the outer surface of the annular sidewall. The second notch has a second bottom surface that faces outward. The third and fourth projections are spaced outward from the second bottom surface. The third undercut region is formed between the third projection and the second bottom surface. The fourth undercut region is formed between the fourth projection and the second bottom surface. The second bottom surface extends at a non-parallel, non-perpendicular angle to the outer surface of the top wall and at a non-parallel, non-perpendicular angle to the outer surface of the annular sidewall.

In one example, the non-parallel, non-perpendicular angle between the first bottom surface and the outer surface of the top wall is greater than 90 degrees. The non-parallel, non-perpendicular angle between the first bottom surface and the outer surface of the annular sidewall is greater than 90 degrees. The non-parallel, non-perpendicular angle between the second bottom surface and the outer surface of the top wall is greater than 90 degrees. The non-parallel, non-perpendicular angle between the second bottom surface and the outer surface of the annular sidewall is greater than 90 degrees.

In one example, the first projection has an inward direct first face. The inward directed first face and the first bottom wall are separated by the first undercut region. The inward directed first face and the first bottom wall are planar surfaces. The second projection has an inward direct second face. The inward directed second face and the first bottom wall are separated by the second undercut region. The inward directed second face is a planar surface. The third projection has an inward direct third face. The inward directed third face and the second bottom wall separated by the third undercut region. The inward directed third face and the second bottom wall are planar surfaces. The fourth projection has an inward direct fourth face. The inward directed fourth face and the second bottom wall are separated by the fourth undercut region. The inward directed fourth face is a planar surface.

In one example, at least a portion of the shoulder region projects outward beyond the annular sidewall.

In one example, a first portion of the shoulder region adjacent the first sidewall portion projects, at least in part, outward beyond the first sidewall portion. A second portion of the shoulder region adjacent the second sidewall portion projects, at least in part, outward beyond the second sidewall portion. A third portion of the shoulder region adjacent the third sidewall portion projects, at least in part, outward beyond the third sidewall portion. A fourth portion of the shoulder region adjacent the fourth sidewall portion projects, at least in part, outward beyond the fourth sidewall portion.

In one example, a first edge of the first bottom surface that is proximate the outer surface of the annular sidewall portion and spaced away from the outer surface of the top wall is positioned laterally outward from the outer surface of the annular sidewall portion. A second edge of the second bottom surface that is proximate the outer surface of the annular sidewall portion and spaced away from the outer surface of the top wall is positioned laterally outward from the outer surface of the annular sidewall portion.

In one example, the inner surface of the top wall and the inner surface of the annular sidewall defines an internal cavity.

In one example, the first gap is centered between the third and fourth sidewall portions and the second gap is centered between the third and fourth sidewall portions.

In one example, the first and second sidewall portions are generally parallel to one another. The third and fourth sidewall portions are generally parallel to one another. The third and fourth sidewall portions are generally perpendicular to the first and second sidewall portions.

In one example, the first notch is formed between first and second support walls that are spaced apart a third distance. The third distance is greater than the first distance. The first projection extends from the first support wall towards the second support wall. The second projection extends from the second support wall towards the first support wall. The second notch is formed between third and fourth support walls that are spaced apart a fourth distance. The fourth distance is greater than the second distance. The third projection extends from the third support wall towards the fourth support wall. The fourth projection extends from the fourth support wall towards the third support wall.

In one example, the inward directed first and second faces are substantially parallel to the outward directed first bottom wall. The inward directed third and fourth faces are substantially parallel to the outward directed second bottom wall.

In one example, a third notch is formed in a third portion of the shoulder region. The third notch has fifth and sixth projections extending towards one another. Distal ends of the fifth and sixth projections are spaced apart a fifth distance forming a third gap therebetween. The fifth projection forms a fifth undercut region of the third notch. The sixth projection forms a sixth undercut region of the third notch. A fourth notch is formed in a fourth portion of the shoulder region. The fourth portion of the shoulder region is on an opposed side of top wall as the third portion of the shoulder region. The fourth notch has seventh and eighth projections extending towards one another. Distal ends of the seventh and eighth projections are spaced apart a sixth distance forming a fourth gap therebetween. The seventh projection forms a seventh undercut region of the fourth notch. The eighth projection forms an eighth undercut region of the fourth notch.

In one example, the gaps of the first and second notches form a first axis. The gaps of the third and fourth notches form a second axis that is perpendicular to the first axis.

In one example, an assembly is provided that includes a housing as outlined above. Also, the assembly includes a band that forms a continuous loop when attached to the housing. The band has a first portion extending within the first notch and a second portion extending within the second notch.

In an example, the assembly includes a retail merchandise package having an outer periphery. The band extends around the outer periphery and secures the housing to the retail merchandise package.

In one example, the band has a width and a thickness. The width is parallel to the first and second bottom surfaces and the thickness is measured perpendicular to the first and second bottom surfaces. The width is greater than the thickness.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
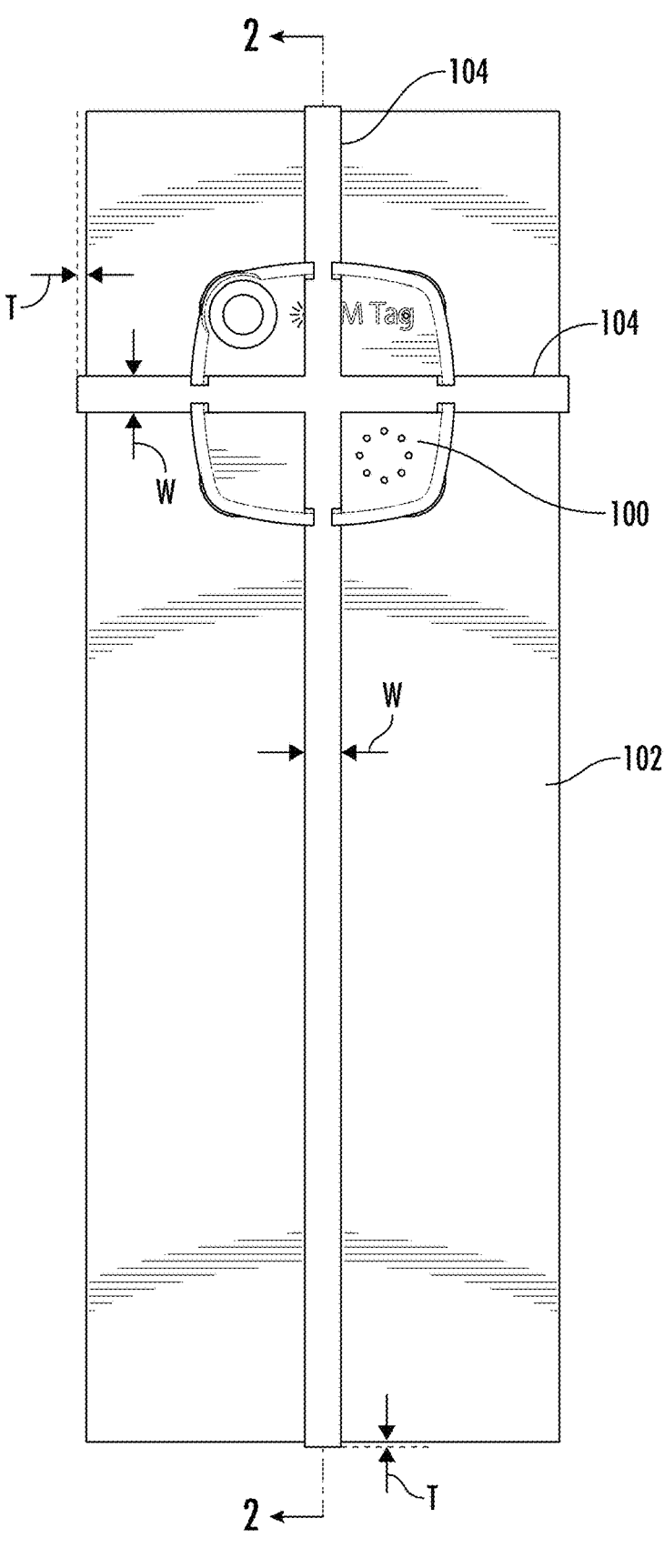
FIG. 1 is a front view of a security tag secured to a product.

FIG. 1 illustrates a security tag 100 attached to a retail merchandise package 102 by bands 104. The security tag 100 can include internal components for assisting detecting potential theft of the retail merchandise package 102.

In this example, a pair of bands 104 are provided, one oriented vertically and another oriented horizontally. In other examples, the pair of bands 104 could be provided by a single band that is wrapped around the retail merchandise package 102 to provide both the vertical and horizontal components. In other examples, a single band that is only oriented horizontally or vertically may be provided.

Figure 2:
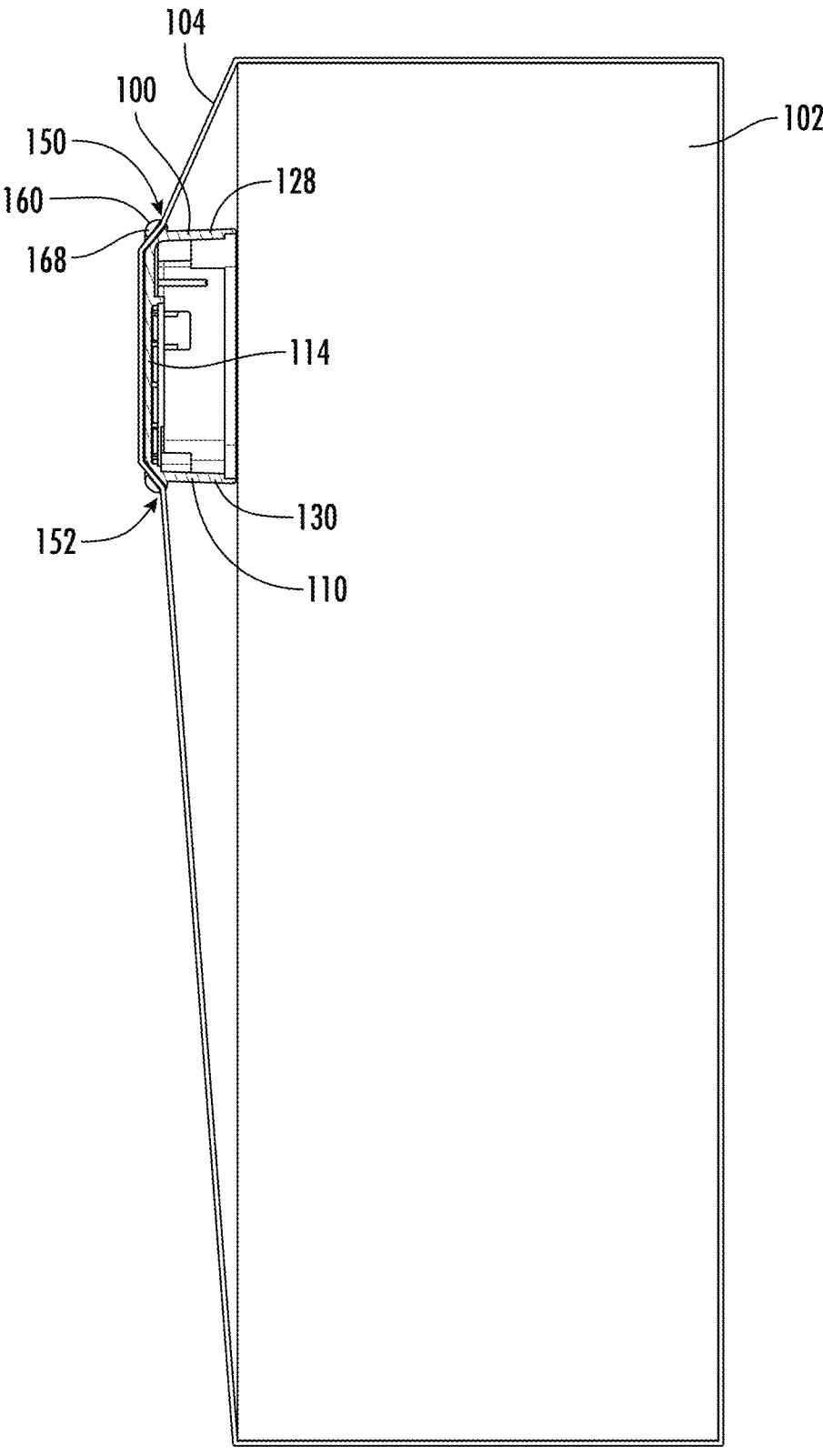
FIG. 2 is a cross-sectional illustration of FIG. 1.

FIG. 2 is a cross-sectional illustration taken about line 2-2 in FIG. 1.

Figure 3:
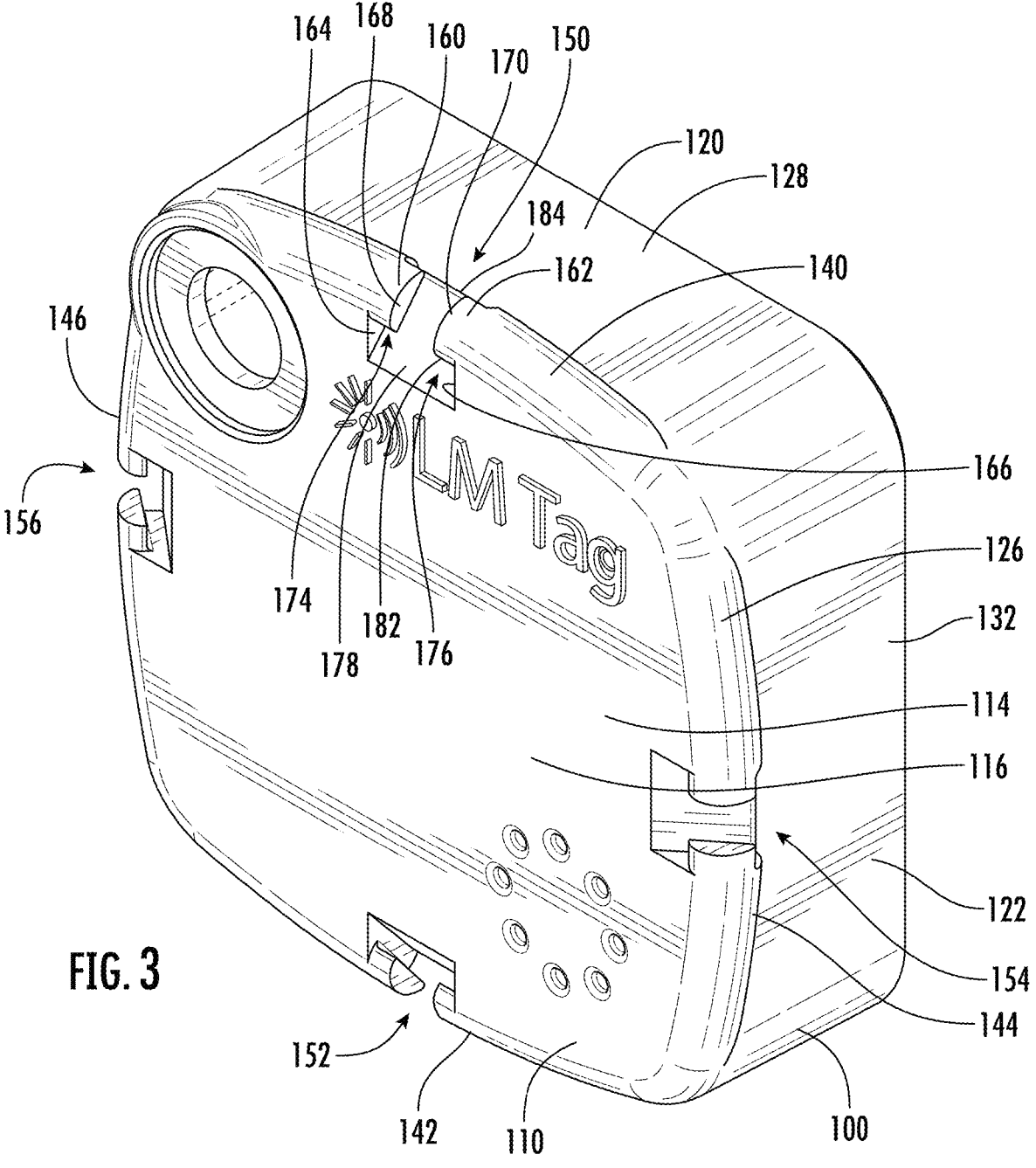
FIG. 3 is a perspective illustration of the security tag removed from the product.

With reference to FIG. 3—The security tag 100 includes an outer housing 110 that defines an internal cavity 112 that houses various electronic components depending on the application. For example, sensors including light sensors, wire break sensors, motion sensors, RFID sensors may be included. Communication components such as transponders and receivers for communicating status information and or theft event information may be provided. Lights, speakers, vibrators and other indicators may be provided.

Figure 4:
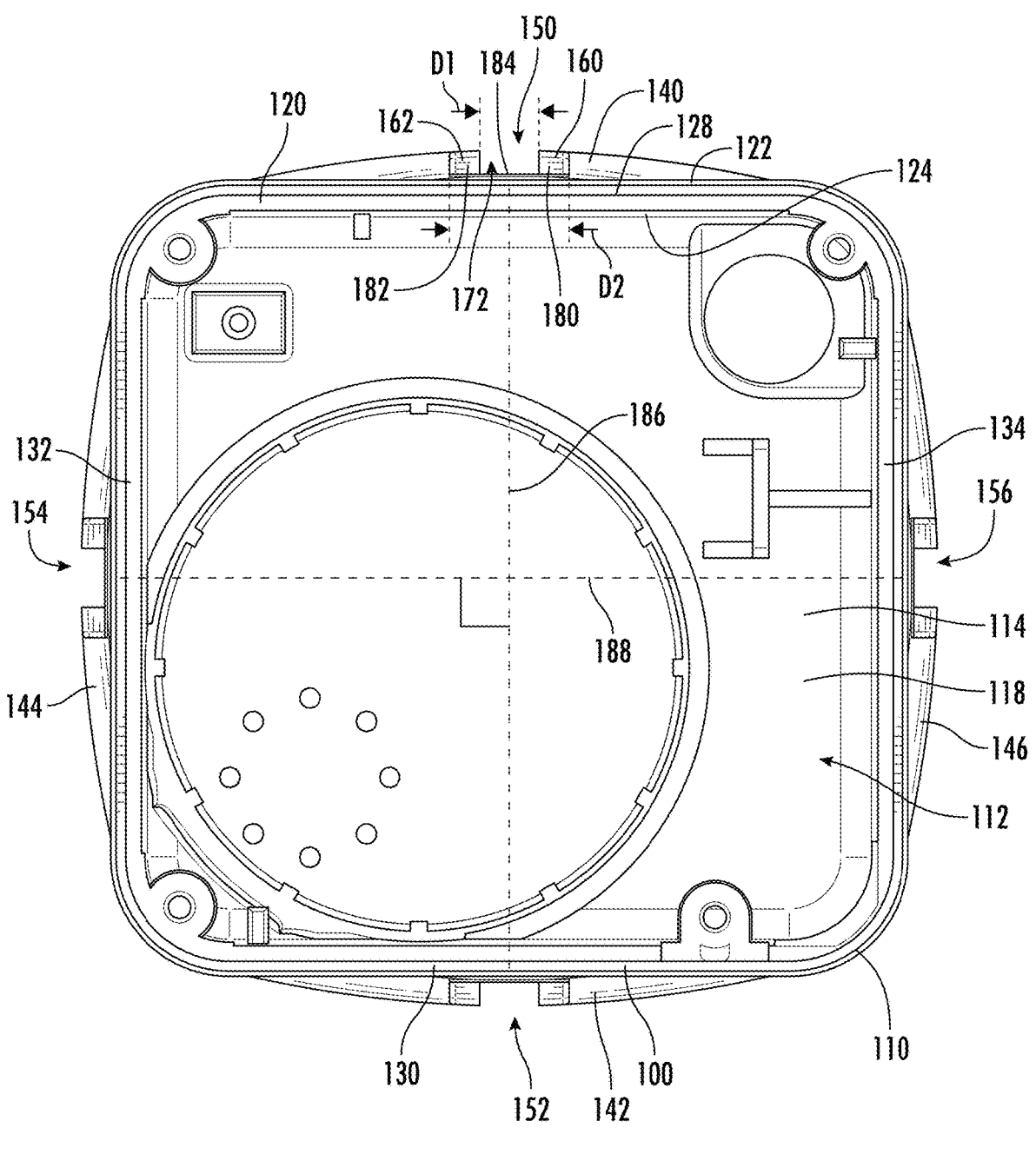
FIG. 4 is a rear view illustration of the housing of the security tag of FIG. 3.
Figure 5:
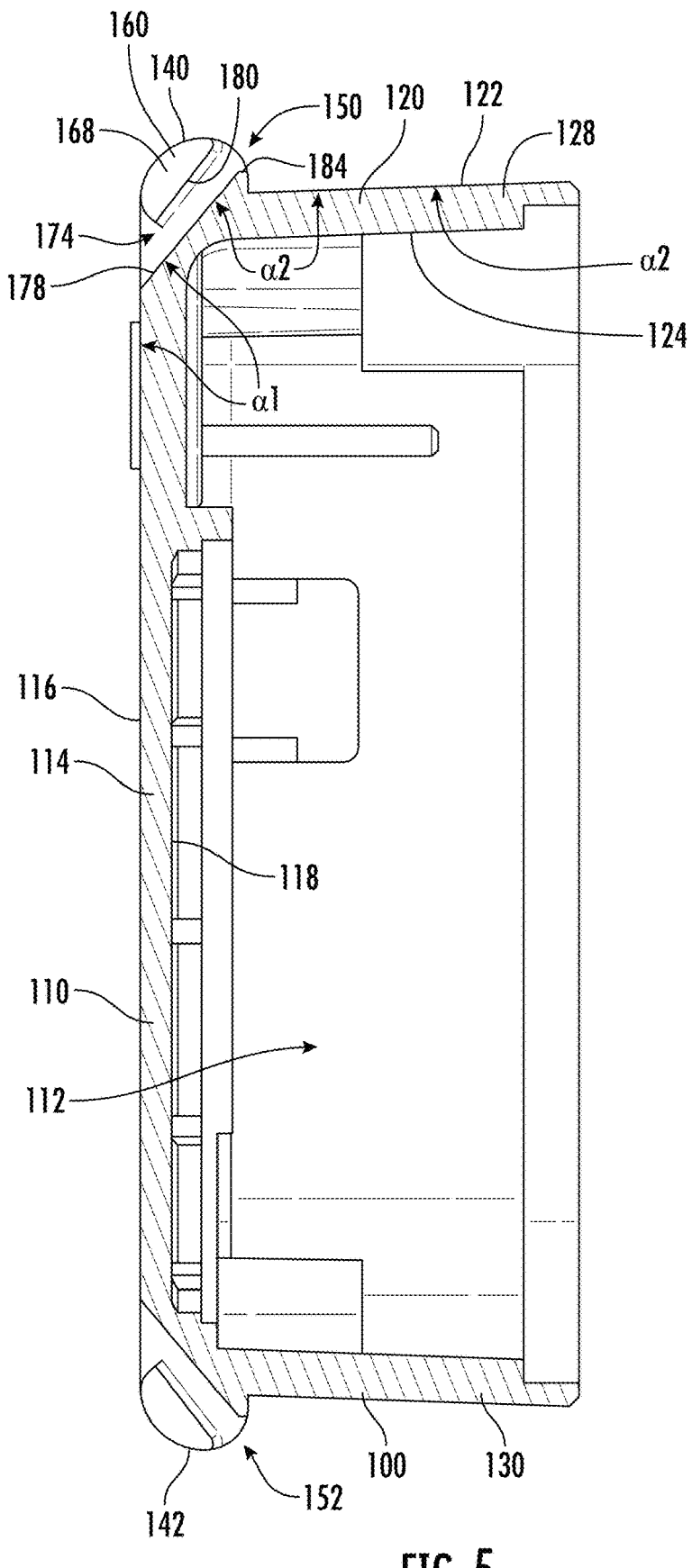
FIG. 5 is an enlarge cross-sectional illustration of the security tag of FIG. 3.

With reference to FIGS. 3-5, the housing 110 will be described in more detail. The housing 110 is designed to provide for easy attachment of the security tag 100 to the retail merchandise package 102 and particularly for receiving portions of the one or more bands 104 that secure the security tag 100 to the package 102.

The housing 110 includes a top wall 114 that has an outer surface 116 and an opposed inner surface 118. The outer surface 116 forms part of the outer periphery of the housing 110 and the inner surface 114 bounds, in part, the internal cavity 112.

An annular sidewall wall 120 extends outward from the top wall 114 forming an intersection therebetween. The annular sidewall has a sidewall outer surface 122 and a sidewall inner surface 124. The sidewall outer surface 122 forms part of the outer periphery of the housing 110 and the sidewall inner surface 124 bounds, in part, the internal cavity 112. The annular sidewall 120 cooperates with the top wall 114 to further define internal cavity 112.

In the illustrated embodiment, the annular sidewall 120 provides a generally rectangular peripheral shape and has first, second, third, and fourth sidewall portions 128, 130, 132, 134, 136. The first and second sidewall portions 128, 130 are generally parallel to one another and spaced part from one another. The third and fourth sidewall portions 132, 134 are parallel to one another and spaced apart from one another. The third and fourth sidewall portions 132, 134 are generally perpendicular to and extend between the first and second sidewall portions 128, 130.

A shoulder region 126 is formed proximate the intersection of the top wall 114 and the annular sidewall 120. First, second, third and fourth shoulder region portions 140, 142, 144, 146 extend laterally outward beyond corresponding ones of the first, second, third, and fourth sidewall portions 128, 130, 132, 134.

In this example, first, second, third and fourth notches 150, 152, 154, 156 are formed in the first, second, third and fourth should region portions 140, 142, 144, 146. The notches 150, 152, 154, 156 receive and secure bands 104. The notches 150, 152, 154, 156 are generally the same so only a single notch will be described.

First notch 150 includes first and second projections 160, 162 that extend from first and second support walls 164, 166 in a cantilevered configuration towards one another. Distal ends 168, 170 of the first and second projections 160, 162 are spaced apart a first distance D1 forming a first gap 172 therebetween. The gap 172 allows the band 104 to be easily inserted into first notch 150 without having to thread an end of the band 104 through the notch. Instead, the user can simply pass any portion of the band 104 through gap 172.

The first notch 150 is formed between the first and second support walls 164, 166. The first and second support walls 164, 166 are spaced from one another a second distance D2 that is greater than distance D1.

In this example, first gap 172 is centered along first sidewall portion 128 and consequently between the third and fourth sidewall portions 132, 134.

The first projection 160 forms a first undercut region 174 of the first notch 150. The second projection 162 forms a second undercut region 176 of the first notch 150. The first notch 150 includes a bottom surface 178 that faces outward. The first and second projections 160, 162 are spaced outward from the first bottom surface 178 such that the first and second undercut regions 174, 176 are formed therebetween.

The first bottom surface 178 extends at a non-parallel, non-perpendicular angle α1 to the outer surface 116 of the top wall 114 and at a non-parallel, non-perpendicular angle α2 to the outer surface 122 of the annular sidewall 120 and particular first sidewall portion 128. In particular, angles α1 and α2 are greater than 90 degrees.

The first projection 160 has an inward direct first face 180 that is separated from the first bottom surface 178 by the first undercut region 174. The inward directed first face 180 and the first bottom surface 178 are generally planar surfaces that are, in some examples, generally parallel (e.g. plus or minus 10 degrees from one another). The second projection 162 has a similar inward directed second face 182. The first and second inward directed faces 180, 182 may be generally co-planar.

A first edge 184 of the first bottom surface 178 that is proximate the outer surface 122 of the first sidewall portion 128 is positioned laterally outward from the outer surface 122 of the first sidewall portion 128.

The opposed notches 150, 152 and 154, 156 are aligned and define first axis 186, 188, respectively. In this example, these axes 186, 188 are generally perpendicular to one another.

In an assembled state, the bands 104 form continuous loops that extend around packaging 102. A portion of the bands 104 extends into corresponding notches 150, 152, 154, 156 and into the corresponding undercut regions provided thereby.

In this example, the bands 104 have a width W that is greater than a thickness T. Further, width W is preferably greater than distance D1 so that the band extends into the undercut regions of the associated notches.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A housing for a security tag comprising:
a top wall having a top wall outer surface and an opposed top wall inner surface;
an annular sidewall wall extending outward from the top wall forming an intersection therebetween, the annular sidewall having a sidewall outer surface and a sidewall inner surface;
a shoulder region formed proximate the intersection of the top wall and the annular wall;
a first notch formed in a first portion of the shoulder region, the first notch having first and second projections extending towards one another, distal ends of the first and second projections being spaced apart a first distance forming a first gap therebetween, the first projection forming a first undercut region of the first notch, the second projection forming a second undercut region of the first notch; and
a second notch formed in a second portion of the shoulder region, the second portion of the shoulder region being on an opposed side of top wall as the first portion of the shoulder region, the second notch having third and fourth projections extending towards one another, distal ends of the third and fourth projections being spaced apart a second distance forming a second gap therebetween, the third projection forming a third undercut region of the second notch, the fourth projection forming a fourth undercut region of the second notch;
wherein:
the first notch has a first bottom surface that faces outward, the first and second projections being spaced outward from the first bottom surface, the first undercut region being formed between the first projection and the first bottom surface, the second undercut region being formed between the second projection and the first bottom surface, the first bottom surface extending at a non-parallel, non-perpendicular angle to the outer surface of the top wall and at a non-parallel, non-perpendicular angle to the outer surface of the annular sidewall; and
the second notch has a second bottom surface that faces outward, the third and fourth projections being spaced outward from the second bottom surface, the third undercut region being formed between the third projection and the second bottom surface, the fourth undercut region being formed between the fourth projection and the second bottom surface, the second bottom surface extending at a non-parallel, non-perpendicular angle to the outer surface of the top wall and at a non-parallel, non-perpendicular angle to the outer surface of the annular sidewall.

2. The housing of claim 1, wherein the annular sidewall includes first, second, third and fourth sidewall portions, the first and second sidewall portions being spaced apart and opposed from one another, the third and fourth sidewall portions being spaced apart and opposed from one another, the third and fourth sidewall portions extending between the first and second sidewall portions, the first portion of the shoulder region being provided between the first sidewall portion and the top wall, the second portion of the shoulder region being provided between the second sidewall portion and the top wall.

3. The housing of claim 1, wherein:
the non-parallel, non-perpendicular angle between the first bottom surface and the outer surface of the top wall is an interior angle being greater than 90 degrees;
the non-parallel, non-perpendicular angle between the first bottom surface and the outer surface of the annular sidewall is an interior angle being greater than 90 degrees;
the non-parallel, non-perpendicular angle between the second bottom surface and the outer surface of the top wall is an interior angle being greater than 90 degrees; and
the non-parallel, non-perpendicular angle between the second bottom surface and the outer surface of the annular sidewall is an interior angle being greater than 90 degrees.

4. The housing of claim 1, wherein:
the first projection has an inward direct first face, the inward directed first face and the first bottom surface separated by the first undercut region, the inward directed first face and the first bottom surface being planar surfaces;
the second projection has an inward direct second face, the inward directed second face and the first bottom surface separated by the second undercut region, the inward directed second face being a planar surface;
the third projection has an inward direct third face, the inward directed third face and the second bottom surface separated by the third undercut region, the inward directed third face and the second bottom surface being planar surfaces;
the fourth projection has an inward direct fourth face, the inward directed fourth face and the second bottom surface separated by the fourth undercut region, the inward directed fourth face being a planar surface.

5. The housing of claim 1, wherein at least a portion of the shoulder region projects outward beyond the annular sidewall.

6. The housing of claim 1, wherein:
a first edge of the first bottom surface that is proximate the outer surface of the annular sidewall portion and spaced away from the outer surface of the top wall is positioned laterally outward from the outer surface of the annular sidewall portion; and
a second edge of the second bottom surface that is proximate the outer surface of the annular sidewall portion and spaced away from the outer surface of the top wall is positioned laterally outward from the outer surface of the annular sidewall portion.

7. The housing of claim 1, wherein the inner surface of the top wall and the inner surface of the annular sidewall defines an internal cavity.

8. The housing of claim 2, wherein the first gap is centered between the third and fourth sidewall portions and the second gap is centered between the third and fourth sidewall portions.

9. The housing of claim 2, wherein:
the first and second sidewall portions are generally parallel to one another;
the third and fourth sidewall portions are generally parallel to one another; and the third and fourth sidewall portions are generally perpendicular to the first and second sidewall portions.

10. The housing of claim 1, wherein:

the first notch is formed between first and second support walls that are spaced apart a third distance, the third distance being greater than the first distance;

the first projection extends from the first support wall towards the second support wall;

the second projection extends from the second support wall towards the first support wall;

the second notch is formed between third and fourth support walls that are spaced apart a fourth distance, the fourth distance being greater than the second distance;

the third projection extends from the third support wall towards the fourth support wall; and the fourth projection extends from the fourth support wall towards the third support wall.

11. The housing of claim 4, wherein:

the inward directed first and second faces are substantially parallel to the outward directed first bottom surface; and the inward directed third and fourth faces are substantially parallel to the outward directed second bottom surface.

12. A housing for a security tag comprising:

a top wall having a top wall outer surface and an opposed top wall inner surface;

an annular sidewall wall extending outward from the top wall forming an intersection therebetween, the annular sidewall having a sidewall outer surface and a sidewall inner surface;

a shoulder region formed proximate the intersection of the top wall and the annular wall;

a first notch formed in a first portion of the shoulder region, the first notch having first and second projections extending towards one another, distal ends of the first and second projections being spaced apart a first distance forming a first gap therebetween, the first projection forming a first undercut region of the first notch, the second projection forming a second undercut region of the first notch; and a second notch formed in a second portion of the shoulder region, the second portion of the shoulder region being on an opposed side of top wall as the first portion of the shoulder region, the second notch having third and fourth projections extending towards one another, distal ends of the third and fourth projections being spaced apart a second distance forming a second gap therebetween, the third projection forming a third undercut region of the second notch, the fourth projection forming a fourth undercut region of the second notch wherein:

a first portion of the shoulder region adjacent the first sidewall portion projects, at least in part, outward beyond the first sidewall portion;

a second portion of the shoulder region adjacent the second sidewall portion projects, at least in part, outward beyond the second sidewall portion;

a third portion of the shoulder region adjacent the third sidewall portion projects, at least in part, outward beyond the third sidewall portion; and a fourth portion of the shoulder region adjacent the fourth sidewall portion projects, at least in part, outward beyond the fourth sidewall portion.

13. A housing for a security tag comprising:

a top wall having a top wall outer surface and an opposed top wall inner surface;

an annular sidewall wall extending outward from the top wall forming an intersection therebetween, the annular sidewall having a sidewall outer surface and a sidewall inner surface;

a shoulder region formed proximate the intersection of the top wall and the annular wall;

a first notch formed in a first portion of the shoulder region, the first notch having first and second projections extending towards one another, distal ends of the first and second projections being spaced apart a first distance forming a first gap therebetween, the first projection forming a first undercut region of the first notch, the second projection forming a second undercut region of the first notch;

a second notch formed in a second portion of the shoulder region, the second portion of the shoulder region being on an opposed side of top wall as the first portion of the shoulder region, the second notch having third and fourth projections extending towards one another, distal ends of the third and fourth projections being spaced apart a second distance forming a second gap therebetween, the third projection forming a third undercut region of the second notch, the fourth projection forming a fourth undercut region of the second notch;

a third notch formed in a third portion of the shoulder region, the third notch having fifth and sixth projections extending towards one another, distal ends of the fifth and sixth projections being spaced apart a fifth distance forming a third gap therebetween, the fifth projection forming a fifth undercut region of the third notch, the sixth projection forming a sixth undercut region of the third notch; and a fourth notch formed in a fourth portion of the shoulder region, the fourth portion of the shoulder region being on an opposed side of top wall as the third portion of the shoulder region, the fourth notch having seventh and eighth projections extending towards one another, distal ends of the seventh and eighth projections being spaced apart a sixth distance forming a fourth gap therebetween, the seventh projection forming a seventh undercut region of the fourth notch, the eighth projection forming an eighth undercut region of the fourth notch.

14. The housing of claim 13, wherein:

the gaps of the first and second notches form a first axis; and the gaps of the third and fourth notches form a second axis that is perpendicular to the first axis.

15. An assembly comprising:

a housing for a security tag comprising:

a top wall having a top wall outer surface and an opposed top wall inner surface;

an annular sidewall wall extending outward from the top wall forming an intersection therebetween, the annular sidewall having a sidewall outer surface and a sidewall inner surface;

a shoulder region formed proximate the intersection of the top wall and the annular wall;

a first notch formed in a first portion of the shoulder region, the first notch having first and second projections extending towards one another, distal ends of the first and second projections being spaced apart a first distance forming a first gap therebetween, the first projection forming a first undercut region of the first notch, the second projection forming a second undercut region of the first notch; and a second notch formed in a second portion of the shoulder region, the second portion of the shoulder region being on an opposed side of top wall as the first portion of the shoulder region, the second notch having third and fourth projections extending towards one another, distal ends of the third and fourth projections being spaced apart a second distance forming a second gap therebetween, the third projection forming a third undercut region of the second notch, the fourth projection forming a fourth undercut region of the second notch a band that forms a continuous loop when attached to the housing, the band having a first portion extending within the first notch and a second portion extending within the second notch, a third portion extending from the first notch to the second notch, the third portion extending over the top wall outer surface when the first portion extends within the first notch and when the second portion extends within the second portion.

16. The assembly of claim 15 comprising:

a retail merchandise package having an outer periphery;

the band extending around the outer periphery and securing the housing to the retail merchandise package.

17. The assembly of claim 15, wherein:

the first gap has a first width;

the second gap has a second width;

the band has a third width and a thickness, the third width being greater than the first width, the third width being greater than the second width; and the third width being greater than the thickness.

\* \* \* \* \*